United States Patent [19]

Parkinson

[11] Patent Number: 4,488,443
[45] Date of Patent: Dec. 18, 1984

[54] EXPANDED RANGE MONOPOLE TORQUE MEASURING SYSTEM

[75] Inventor: James R. Parkinson, Vergennes, Vt.

[73] Assignee: Simmonds Precision Products, Inc., Tarrytown, N.Y.

[21] Appl. No.: 459,492

[22] Filed: Jan. 20, 1983

[51] Int. Cl.³ .............................................. G01L 3/10
[52] U.S. Cl. ............................... 73/862.33; 73/862.34
[58] Field of Search ......................... 73/862.33, 862.34

[56] References Cited

U.S. PATENT DOCUMENTS

| | | | |
|---|---|---|---|
| 3,194,065 | 7/1965 | Wilson | 73/862.34 |
| 3,208,274 | 9/1965 | Rosaler | 73/862.34 |
| 3,273,386 | 9/1966 | Sipler | 73/862.34 |
| 3,548,649 | 12/1970 | Parkinson | 73/862.34 |
| 3,762,217 | 10/1973 | Hagen | 73/862.28 |
| 4,208,904 | 6/1980 | Schindler | 73/862.34 |

*Primary Examiner*—Charles A. Ruehl
*Assistant Examiner*—James R. Giebel
*Attorney, Agent, or Firm*—Cushman, Darby & Cushman

[57] ABSTRACT

A torque measurement system for measuring shaft torque has two toothed wheels mounted in spaced apart relationship. Each of the wheels has a plurality of axially extending spaced teeth along its periphery extending into spaces between the teeth of the other, forming an interlaced array of teeth having tooth spacing interstices therebetween. A discontinuity is provided in the tooth pattern at at least one location around the periphery of the two wheels to serve as an index marker. A single detector such as a variable relunctance sensor is mounted proximate the wheels to provide output signals representative of circumferential widths of tooth spacing interstices and also representative of the index marker. The widths of the interstices change upon shaft torque deflection, and signals from the sensor are processed to produce a DC signal proportional to torque. The two wheels can be offset in a noload condition so that adjacent tooth spacing interstices are approximately equal in a torque deflection range of interest.

14 Claims, 7 Drawing Figures

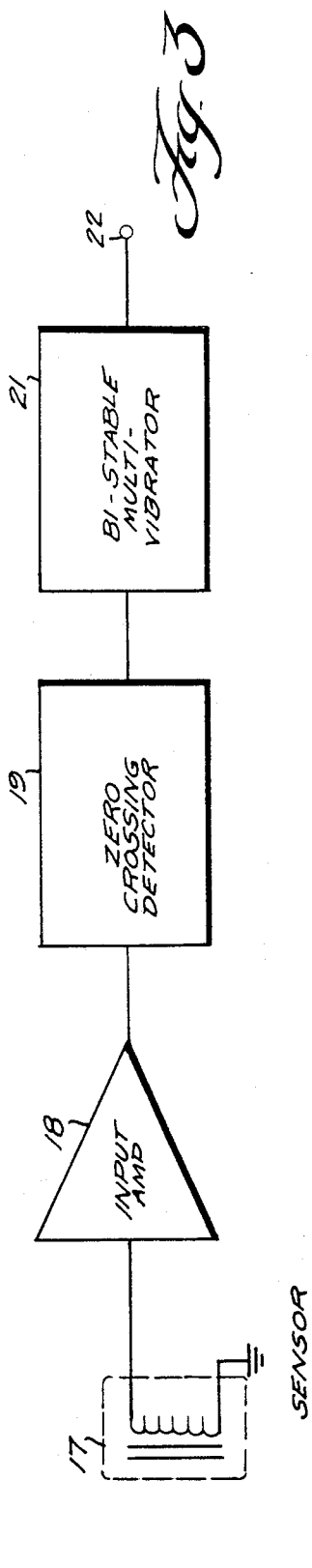
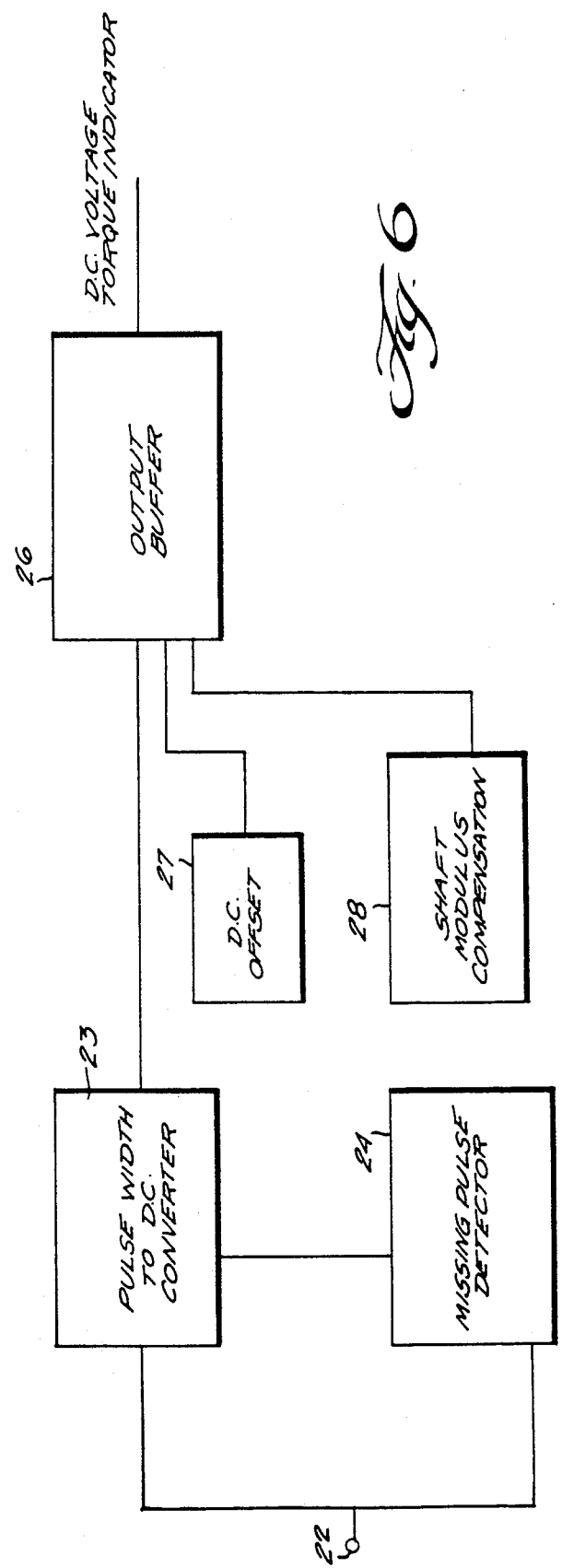

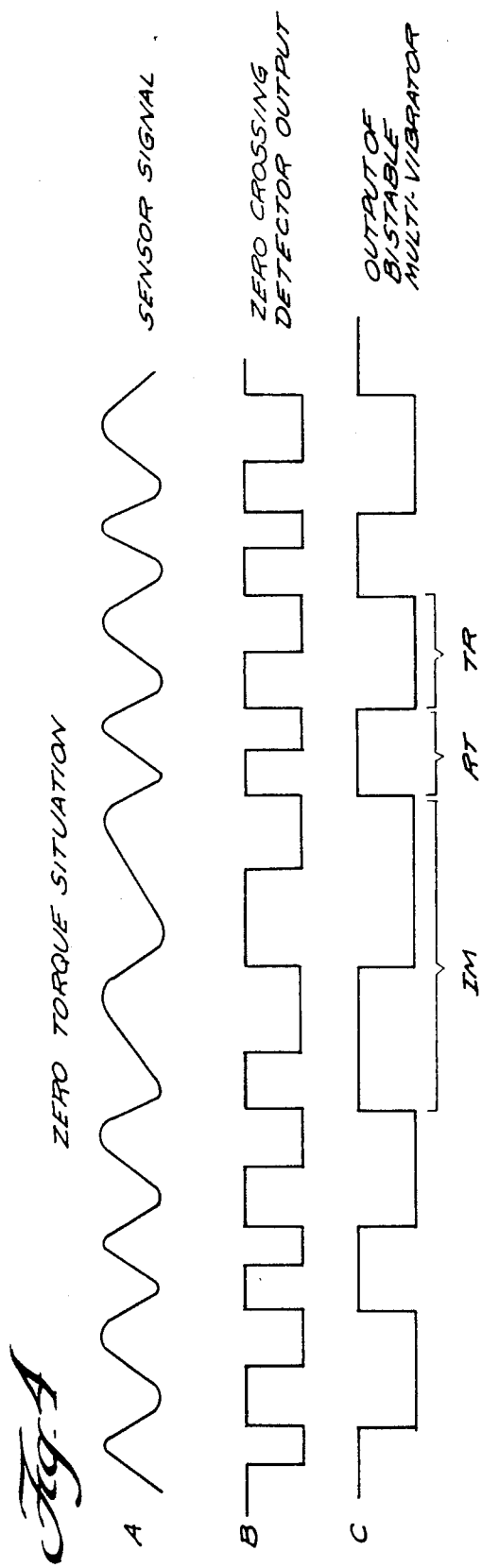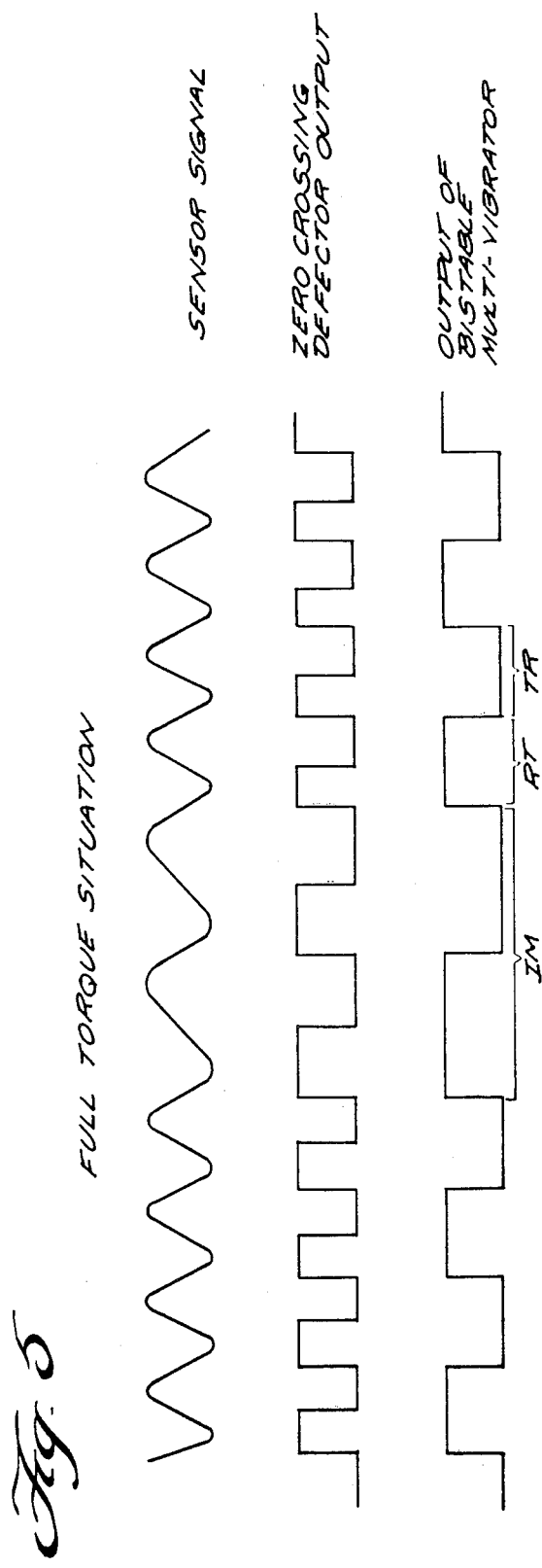

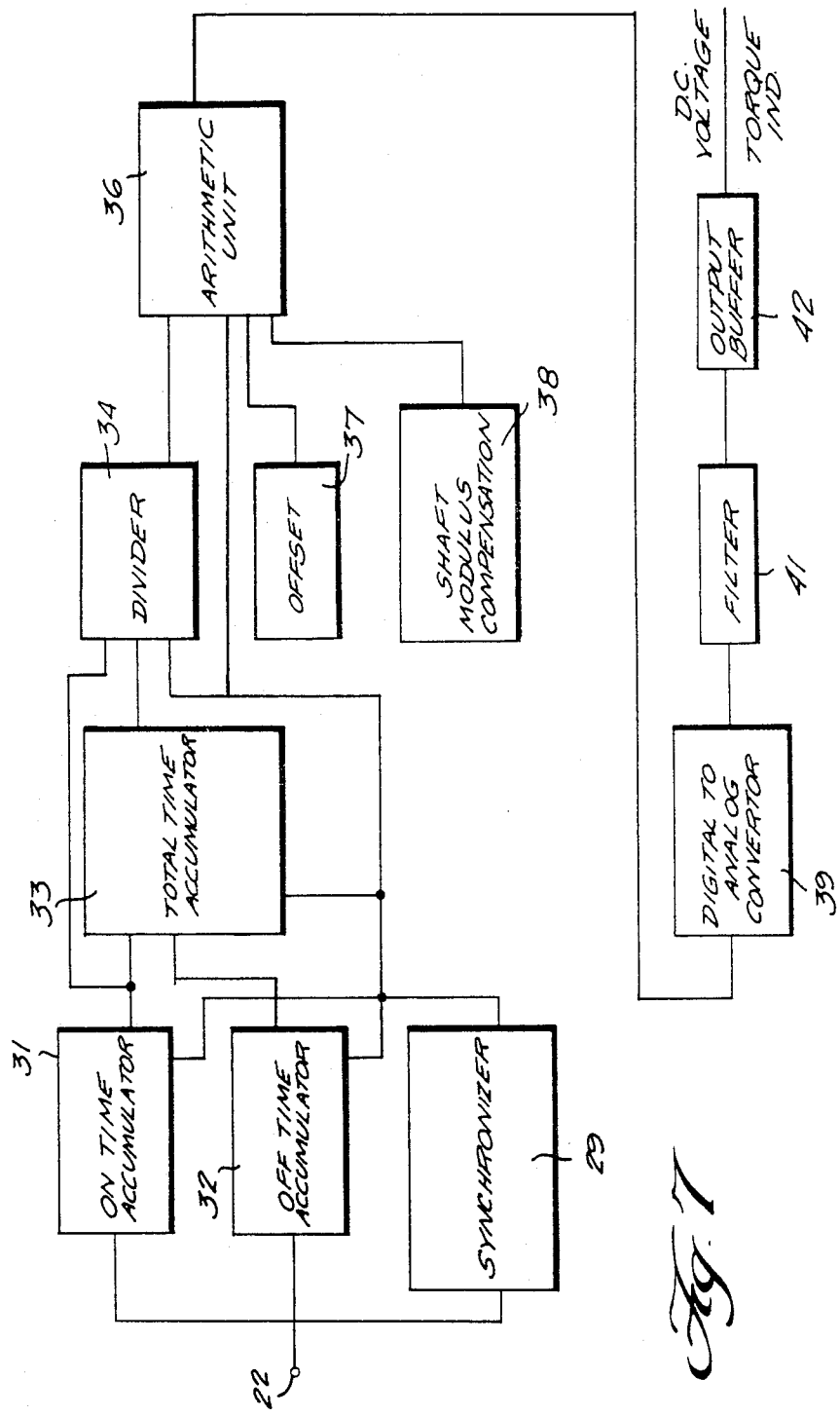

EXPANDED RANGE MONOPOLE TORQUE MEASURING SYSTEM

BACKGROUND OF THE INVENTION

This invention relates to an apparatus for measuring torque through sensing shaft deflection. More particularly, this invention relates to an improvement over the torque measurement system disclosed in U.S. Pat. No. 3,548,649 which is assigned to the assignee of the present invention.

As disclosed in U.S. Pat. No. 3,548,649, the prior art has included systems for measuring torque through shaft deflection techniques. In such prior art techniques a torque shaft assembly uses two exciter wheels of magnetic material attached to a torque transmitting shaft at different axial positions thereon. As torque increases, the exciter wheels are rotationally deflected with respect to each other in a manner such that the rotational deflection is proportional to the applied torque. The torque sensor utilizes two magnetic pick-ups, each of which is mounted in close proximity to each of the exciter wheels, generating two approximate sinusoidal signals as the exciter wheel teeth pass the sensor pole pieces. The phase relationship of the two signals is related to the relative displacement of the exciter wheels, and is therefore related to the applied torque. Circuitry is provided to detect the phase relationship of the two signals and generate an indication of the torque.

As discussed in U.S. Pat. No. 3,548,649, such prior art systems were relatively complex and were subject to errors due to misalignment of a torque shaft with respect to the center line of the sensors. Accordingly, an improved system is disclosed in U.S. Pat. No. 3,548,649 which is of a "monopole" type, using only a single variable reluctance-type sensor.

In accordance with the specific disclosures of U.S. Pat. No. 3,548,649, there is provided a torque shaft assembly having two exciter wheels, one of which is a torque wheel attached directly to the shaft and the second a reference wheel attached to a reference sleeve which, in turn, is attached to the shaft spaced from the torque wheel. Each of the exciter wheels is provided with a row of axially extending tooth members along its periphery, and the two wheels are so positioned that the teeth from one wheel are positioned between the teeth of the other wheel. The distance that the teeth of one wheel extend into the space between the teeth of the other wheel is a sensing width used as a datum plane for a variable reluctance sensor positioned in close proximity thereto.

As the exciter wheels are rotated, an AC signal is produced by the sensor, wherein any two adjacent cycles of the signal will be controlled by the relative distance between the teeth in the sensing width depending upon the relative position between the two wheels. A zero cross-over detector converts the sensor AC signal into a train of pulses which are utilized to alternatively turn "off" and "on" a bistable multivibrator, producing a rectangular waveform whose ratio of "on" time to "off" time is directly related to wheel tooth position. The bistable multivibrator output is filtered into two DC voltages, the greater positive output of which is carried to the input of a display portion of the system.

Torque measurement systems constructed in accordance with the teachings of U.S. Pat. No. 3,548,649 have received wide commercial acceptance. However, systems such as disclosed in U.S. Pat. No. 3,548,649 did not have any means for indexing the system, so that there could be a potential ambiguity with respect to the output signals, as to which output signal corresponded to which of the alternate spacings between the adjacent teeth. Accordingly, in such systems the exciter wheels were mounted with respect to each other such that there were equal distances between the teeth of the two exciter wheels in the no-load condition. Under load conditions the tooth spacing of a tooth of the torque exciter wheel to an adjacent tooth of a reference exciter wheel in the direction of torque deflection would always be smaller than the spacing between a tooth of the reference wheel and an adjacent tooth of the torque wheel in the direction of torque deflection. Thus, potential ambiguity in outputs in the loaded condition is eliminated. However, in the system of U.S. Pat. No. 3,548,649, due to the no-load symmetry in the tooth spacing between the two exciter wheels, the full torque situation represented by a deflection between the two exciter wheels of only less than one half of a tooth space. Generally, such systems used a deflection of one quarter of one tooth to tooth spacing for full torque, corresponding to an electrical phase range of 20°–50°.

SUMMARY OF THE INVENTION

It is an object of the present invention to provide an improvement to the system of U.S. Pat. No. 3,548,649 in which torque measurement accuracy is improved and in which an expanded range of torque deflection can be measured.

It is another object of this invention to provide a monopole torque measurement system utilizing a pair of exciter wheels and a single sensor in which at least one sensible index marker is provided around the periphery of the exciter wheels for sensing by the one sensor to provide system indexing.

It is another object of this invention to provide an expanded range monopole torque measurement system utilizing a pair of exciter wheels the respective teeth of which are offset in a no-load condition so that a torque range of interest is represented by a symmetrical pulse train.

Briefly, in accordance with one embodiment of the invention, a torque measurement system is provided for measuring torque on a shaft which includes first and second toothed wheels mounted in spaced-apart relationship on the shaft. Each of the first and second wheels has a plurality of axially extending spaced teeth along its periphery extending into spaces between the teeth of the other wheel and forming therewith an interlaced array of teeth having tooth spacing interstices therebetween. At least one of the first and second wheels has at least one sensible index marker on its periphery. A single detector means is provided rotatable with respect to the shaft and mounted proximate the shaft near the interlaced array of teeth. The single detector means is responsive to circumferential widths of the interstices for providing an indication of shaft torque. The detector means is also responsive to the at least one sensible index marker for providing a once-per-shaft revolution indication for system indexing.

Other objects and advantages of the invention will appear from the drawings taken together with the detailed description of preferred embodiments of the invention.

BRIEF DESCRIPTION OF THE DRAWINGS

FIG. 3 is a circuit block diagram of a portion of the electronics provided for processing signals picked up by the sensor of FIG. 2.

FIG. 4 is a waveform diagram illustrating the functional timing of the signals developed by the circuitry of FIG. 3 for a zero torque situation.

FIG. 5 is a waveform timing diagram illustrating the functional timing of the signals developed by the circuitry of FIG. 3 for a full torque situation.

FIG. 6 is a block diagram of one embodiment of an analog implementation of circuitry for receiving the signal from the circuitry of FIG. 3 and developing a DC voltage proportional to torque.

FIG. 7 is a block diagram of one embodiment of a digital implementation of circuitry for receiving the signal from the circuitry of FIG. 3 and developing a DC voltage output indicative of torque.

DETAILED DESCRIPTION OF THE PREFERRED EMBODIMENTS

Figure 1:
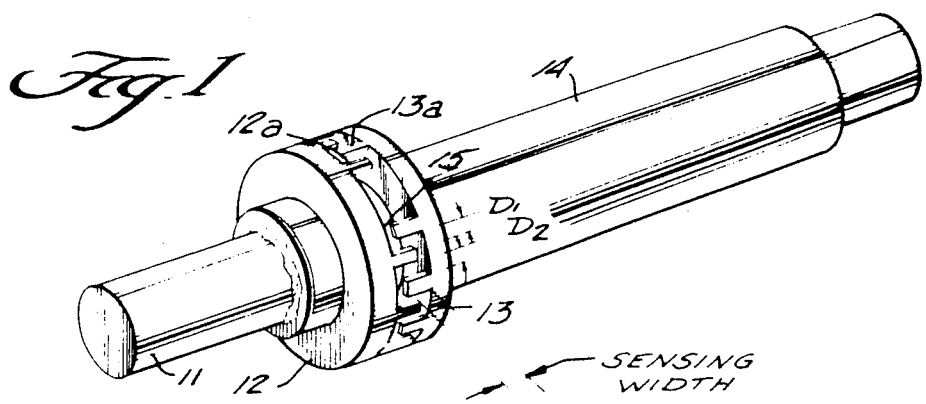
FIG. 1 is a perspective view of a torque shaft with exciter wheels arranged thereon in accordance with the present invention.

Referring now to FIG. 1, there is shown a torque shaft 11 with two exciter wheels 12 and 13 attached thereto. The exciter wheel 12 is attached directly to the shaft 11 while the exciter wheel 13 is attached to a sleeve 14 which, in turn, is attached at one end to the shaft 11. As shown in FIG. 1, each of the exciter wheels 12 and 13 has an array of axially extending teeth, indicated by reference numerals 12a and 13a. In accordance with a preferred embodiment of the invention, a discontinuity generally indicated by reference numeral 15 is provided in the periphery of the exciter wheels 12 and 13. In the specific embodiments shown in FIG. 1, this discontinuity takes the form of the omission of one tooth from exciter wheel 12 and the omission of one tooth from the exciter wheel 13.

In accordance with one embodiment of the invention, the exciter wheels 12 and 13 are offset with respect to each other in a no torque situation. Thus, in FIG. 1 the distance D1 represents the distance between a tooth 13a of exciter wheel 13 and an adjacent tooth 12a of exciter wheel 12, and the distance D2 represents the space between the tooth 12a and the next adjacent tooth 13a. The amount of offset in tooth spacing depends upon the particular application of the invention. The guiding principle is to offset the teeth in a no-load condition with respect to one another such that, upon relative deflection between the two exciter wheels due to torque in the shaft, the spacings D1 and D2 become approximately equal at a deflection corresponding to the torque range of maximum interest. As discussed more fully hereafter, such a symmetrical tooth space arrangement allows an increase in maximum pulses per second and permits an extended range.

In FIG. 1, it can be seen that the two exciter wheels 12 and 13 are positioned just far enough apart from each other so that the teeth of one wheel are positioned within the space between the teeth of the opposite wheel. The distance that each of the teeth extends into the space between adjacent teeth of the opposite wheel determines the sensing width, as shown in FIG. 1.

Figure 2:
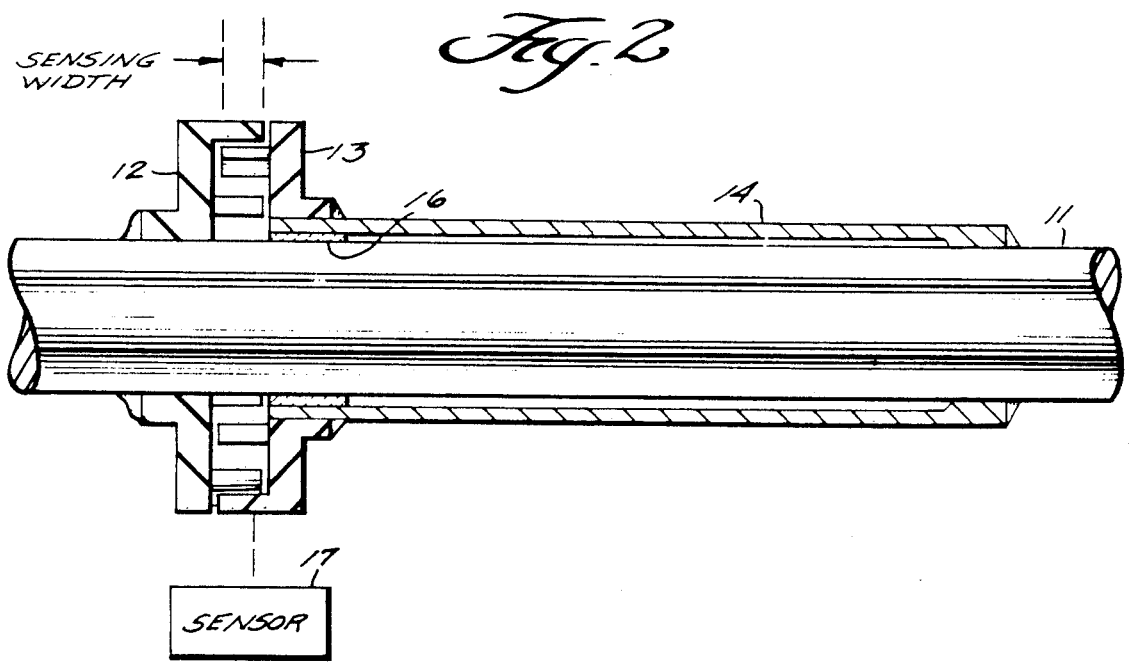
FIG. 2 is a cross sectional view of the torque shaft shown in FIG. 1.

In FIG. 2, the sensing width is shown from another perspective, again showing this width to be the distance that the teeth of one wheel extend into the space between the teeth of the other wheel. As shown, the reference sleeve 14 is provided with a bearing member 16 at its free end to take up the space between the sleeve and the shaft 11 where the reference exciter wheel 13 is supported. In FIG. 2 a single sensor 17 is shown positioned in close proximity to the exciter wheels 12 and 13 and such that the sensing width formed by the arrangement of the teeth 12a and 13a on the two wheels provides a datum plane for the sensor to measure, as more fully discussed hereafter.

The single sensor 17 is provided to generate outputs representative of a relationship between the tooth spacing, i.e. D1 and D2. Torque applied to the shaft 11 results in a deflection such that the tooth spacing changes in accordance with the deflection, and hence the torque. In accordance with the broadest aspects of the invention, at least one discontinuity 15 is provided somewhere in the periphery of the exciter wheels, with the single sensor 17 functioning to sense the discontinuity to provide an indexing function. In accordance with a specific embodiment of the invention, the discontinuity 15 is provided by omitting one tooth from each of the exciter wheels 12 and 13. Other forms of discontinuity are of course possible. Further, more than one discontinuity may be provided around the periphery of the exciter wheels 12 and 13. Thus, for example, two discontinuities could be provided spaced 180° from one another, or three discontinuities could be provided spaced 120° from each other. In an embodiment such as shown in FIG. 1, wherein there is provided one discontinuity which is formed by omitting a tooth from each of the exciter wheels 12 and 13, if the shaft 11 were a high speed rotating shaft it would be necessary to counterbalance exciter wheels 12 and 13 to account for the lack of symmetrical weight distribution. If, two discontinuities were provided on opposite sides of the exciter wheels 12 and 13, such counterbalancing would not be necessary in that the weight distribution would be symmetrical.

In accordance with one preferred embodiment of the invention the sensor 17 is a variable reluctance-type pickup sensor, although the invention is not so limited. For example, instead of using a variable reluctance pickup sensor and magnetic material for the exciter wheels, a light source and photocell combination could be used for the sensor 17 with the exciter wheels made of a material such that their teeth reflect light from the light source to the photosensor. Thus, the tooth spacings D1 and D2 as well as the presence of the discontinuity 15 could be sensed by such an optical sensor arrangement. However, in accordance with the preferred embodiment of the invention, the sensor 17 is provided as a variable reluctance-type pickup sensor.

Turning now to FIG. 3, there is shown a block diagram of a portion of the electronics coupled to the sensor 17 in accordance with this one preferred embodiment. As mentioned above, the sensor 17 is amplified by an amplifier 18 and an input into a zero crossing detector 19. The AC signal output of the sensor 17, as amplified by amplifier 18, is converted to a train of pulses by the zero crossing detector network 19. The zero cross over point occurs when one of the wheel teeth 12a or 13a and the sensor are in direct alignment; this relationship is used for detection because it is the only point on the AC signal output waveform that is not displaced in time as signal amplitude changes. The zero crossing detector pulses are utilized to alternately turn "off" and "on" a bistable multivibrator 21, thus producing a rectangular waveform at terminal 22 whose ratio of "on" time to "off" time is directly related to wheel tooth spacing.

Turning now to FIG. 4, there is shown a wavefrom diagram illustrating the output signals of the circuitry of FIG. 3. Specifically, curve A in FIG. 4 represents the sensor signal output from sensor 17, curve B represents the zero crossing detector output, and curve C represents the output of the bistable multivibrator present on terminal 22. The waveforms shown in FIG. 4 are for a zero torque situation. In accordance with the present invention, in a zero torque situation the teeth of the two exciter wheels 12 and 13 are offset with respect to one another. Thus, the sensor signal output (curve A) is not a symmetrical sinusoidal signal due to the variation in spacing between the teeth. The presence of the discontinuity 15 in the periphery of the exciter wheels, which in accordance with this one embodiment comprises eliminating one tooth from each of the exciter wheels 12 and 13, results in an output of the bistable multivibrator that has a longer period than any other pulse. Specifically, this is identified in curve C of FIG. 4 as IM, for index marker. Following the period IM in the output of the multivibrator, the next period or output of the bistable multivibrator, identified in FIG. 4 as RT, represents the spacing between a reference tooth 13a and an adjacent torque tooth 12a. This is defined as the "on" time. The time duration of the next output level of the bistable multivibrator, identified in FIG. 4 as TR, represents the tooth spacing between a torque tooth 12a and an adjacent reference tooth 13a, which is defined as the "off" time.

Turning now to FIG. 5, there is shown a waveform diagram of the outputs of the circuitry of FIG. 3 for a full torque situation. As explained before, the offset between the exciter wheels 12 and 13 is set such that upon deflection due to full torque in the torque region of interest, the spacing between adjacent teeth of the two exciter wheels is approximately equal. Thus, the sensor signal represented by curve A in FIG. 5 is a symmetrical sinusoid, except in the area of the discontinuity 15 shown by the period IM in FIG. 5. As before, the output of the bistable multivibrator shown in curve C of FIG. 5 has an on and an off time in the period IM that is longer than the on and off times in any other of the output periods of the bistable multivibrator. This serves as an index marker for indexing the system. As before, the bistable multivibrator output during the period RT represents the spacing between a reference tooth and adjacent torque tooth, and the time period TR shown in FIG. 5 represents a torque tooth to reference tooth spacing, for "off" time.

Significant advantages are achieved by offsetting the two exciter wheels with respect to each other such that symmetrical spacing occurs upon torque deflection in the range of interest. Use of this offset arrangement resulting in a symmetrical pulse train in the torque region of interest allows a significant increase in maximum pulses per second. Thus, a greater number of teeth can be utilized on the exciter wheels and/or the system is adapted for measuring torque and shafts rotating at higher rpm. This, of course, is very important in light of the trend today towards using smaller and higher rpm engines.

The use of a sensible index marker, such as the discontinuity 15 formed by eliminating a tooth from each of the exciter wheels, also is very advantageous. In accordance with the invention, by providing a discontinuity or sensible index marker somewhere around the periphery of the exciter wheels the entire system is re-indexed at least once per revolution. If more than one discontinuity or sensible index marker is provided, of course the system is then indexed more than once per revolution. Such re-indexing is important in that it eliminates the possibility of the electrical system getting out of step due to an extraneous noise pulse. That is, if the electrical system got out of step, "on" time might be counted as "off" time or vice versa. With a system for re-indexing in place which involves provision of at least one sensible index marker, such a problem is obviated. Also, the indexing system eliminates any potential ambiguities as to "on" and "off" times, so that the exciter wheels can be offset with respect to one another to produce an approximate symmetry in output signal at the torque region of interest. The indexing feature of the present invention eliminates any ambiguity in the output signals that might otherwise result from such an arrangement. Thus, a large portion of the tooth space can be used for the detection of shaft torque. Thus, whereas the torque measurement system as disclosed in U.S. Pat. No. 3,548,649 was useful over an electrical phase change of 20° to 50°, a system in accordance with the present invention has a greatly expanded usable range of phase change of 90°-270°.

Turning now to FIG. 6, there is shown a block diagram of an analog implementation of circuitry for use in conjunction with the circuitry of FIG. 3, to provide a DC voltage output which is indicative of torque. Referring to FIG. 6, the output of multivibrator 21 present at terminal 22 is input to a pulse width to DC converter 23 and also to a missing pulse detector circuit 24. The missing pulse detector circuit 24 is responsive to the longer time period IM of the output of the bistable multivibrator to index the system; that is, to enable the pulse width to DC converter 23 to recognize the next output RT of the multivibrator as an "on" time. This indexes the pulse width to DC converter 23 to then recognize succeedingly alternative outputs of the bistable multivibrator as "on" periods. The pulse width to DC converter 23 converts the widths of these outputs RT of the multivibrator to a DC voltage, which is coupled to an output buffer 26. The output buffer 26 also receives inputs from a DC offset circuit 27 and a shaft modulus compensation circuit 28. The shaft modulus compensation circuit 28 merely inputs a signal to the output buffer 26 to compensate for the shaft modulus of whatever particular torque shaft to which the system is applied; typically, such correction factors are supplied by the manufacturer of the torque shaft. The DC offset circuit 27 merely introduces a DC offset to offset the output level of the output buffer 26. The output of the output buffer 26 is a DC voltage which is directly proportional to torque. If desired, the voltage outputs of the pulse width to DC converter corresponding to the pulse widths RT can be averaged over one shaft revolution, or even over several shaft revolutions. Such averaging can be performed by averaging circuitry included in the output buffer 26. Advantageously, the pulse width to DC converter 23 should also include circuitry for generating a DC output corresponding to what would have been an output corresponding to a pulse width RT where the discontinuity 15 is introduced into the periphery of the exciter wheels. That is, since one tooth has been eliminated from each of the exciter wheels, in order to obtain an accurate indication of the "on" time, a pulse should be inserted where a pulse would have been had the teeth not been eliminated. This can be done by simply inserting a pulse corresponding to the pulse width RT measured immediately prior to the multivibrator output IM corresponding to the index marker representing the absence of teeth on the exciter wheels.

Of course, many other analog implementations of circuitry for generating an output representative of torque from the output of the bistable multivibrator at terminal 22 are possible. That shown in FIG. 6 is merely illustrative of one of the many possible variations of circuitry that can be used to this end.

Turning now to FIG. 7, there is shown a possible digital implementation of circuitry for generating a torque indication in response to the multivibrator output present at terminal 22. In accordance with this digital embodiment, the torque information is represented by the duty cycle of the pulse train output of the sensor. The duty cycle is determined by dividing the "on" time period by the total time period. Referring to FIG. 7, a synchronizer circuit 29 is provided to determine which is the "on" time of the output of the multivibrator 21. As before, the synchronizer circuit senses the time interval IM shown in curves C of FIGS. 4 and 5, which corresponds to the "missing" pulse where teeth in the exciter wheels are eliminated. The next pulse, i.e. RT in curves C of FIGS. 4 and 5 is defined as the "on" time period, with the succeeding pulse TR defined as the "off" time. More specifically, an "on" time accumulator 31 is provided in the form of an N-bit counter driven by a suitable clock arrangement which assigns a binary number, 0 through $2^N - 1$ to the "on" time. A similar counter 32 assigns a binary number, 0 through $2^N - 1$ to the "off" time. The missing pulse corresponding to the time period IM will have a count exceeding a "window", so that the synchronizer will identify the next pulse, corresponding to RT, as "on" time.

The "on" time accumulator 31 can be set to accumulate any predetermined number M number of counts of "on" time in order to determine the average "on" time. Similarly, the "off" time accumulator 32 can be set to accumulate any predetermined number M of counts of "off" time to determine the average "off" time. A total time accumulator 33 is provided to determine the average "on" time plus the average "off" time. Typically, the "on" and "off" times and the total time can be averaged for a time corresponding to one revolution of the torque shaft. Then, during the reference pulse or index marker time period IM a divider 34 divides the average "on" time by the total time, to determine a quotient representing the duty cycle, which quotient is proportional to torque. If desired, the divider 34 could also provide scaling of the quotient by multiplication and/or addition. The duty cycle output of the divider 34 is input to an arithmetic unit 36. The arithmetic unit also receives inputs from an offset circuit 37 and a shaft modulus compensation circuit 38 as before. The shaft modulus compensation circuit 38 merely introduces a value into the arithmetic unit that represents a correction factor for a particular torque shaft, and the offset circuit 37 merely introduces a value into the arithmetic unit to produce an offset. The output of the arithmetic unit 36 is thus a corrected digital value representing the torque in the shaft. This output of the arithmetic unit 36 is coupled to a digital analog converter 39, and from there through a suitable filter 41 and output buffer 42. The output of the output buffer 42 is thus a DC voltage which is directly representative of torque in the shaft.

It should be understood that the circuit arrangement of FIG. 7 is merely one of any number of suitable digital implementations of circuitry for producing an electrical signal directly indicating torque in the shaft. Many other possibilities exist and implementation of same is well within the skill of those versed in this art.

Thus what has been described in connection with the preferred embodiments of the invention illustrate the general principles of the invention. Specifically, at least one sensible index marker is provided around the periphery of the exciter wheels to serve an indexing function and define which outputs are "on" times and which are "off" times. More than one sensible marker can be provided around the periphery, but at least one is provided. By having an indexing function in connection with the torque measurement system, the exciter wheels can be offset in a no-load condition such that tooth spacing becomes approximately equal upon deflection of the shaft due to torque in the torque range of interest. This provides a symmetry to the output pulses and allows an increase in the maximum number of pulses per second. Such an arrangement provides enhanced sensitivity of the torque measuring system. Further, since the system with the no-load offset teeth condition provides for a greater range of tooth deflection due to torque, a torque measurement system with enhanced range is provided.

Although the principles of the invention have been illustrated by reference to certain illustrative embodiments, it should be clear to those skilled in the art that various modifications to those illustrative embodiments can be made without departing from the true spirit and scope of the invention, which is intended to be defined in the appended claims.

I claim:

1. A torque measuring system for measuring torque on a shaft comprising first and second toothed wheels mounted in spaced apart relationship on the shaft, each of said first and second wheels having a plurality of axially extending spaced teeth along its periphery extending into spaces between the teeth of the other wheel and forming therewith an interlaced array of teeth having tooth spacing interstices therebetween, at least one of said first and second wheels having at least one sensible index marker on its periphery, a single detector means rotatable relative to the shaft, and mounted proximate the shaft near said interlaced array of teeth, said single detector means responsive to circumferential widths of said interstices for providing an indication of shaft torque, said single detector means also responsive to said at least one sensible index marker for providing an indication for system indexing at least once per revolution of the shaft.

2. A torque measuring system in accordance with claim 1 wherein said at least one sensible index marker comprises a discontinuity in said interlaced array of teeth sensible by said single detector means to provide the at least once per shaft revolution indication for system indexing.

3. A torque measuring system in accordance with claim 2 wherein said axially extending spaced teeth on said first and second wheels have a uniform spacing, respectively, around their periphery except in the area of said discontinuity, and wherein the spacing between the teeth in the area of said discontinuity is substantially larger than the otherwise uniform spacing.

4. A torque measuring system in accordance with claim 2 wherein each of said first and second wheels have a circumference C, and wherein each of said first and second wheels is provided with N−1 teeth spaced apart by a distance C/N to thereby define a discontinuity corresponding to a missing tooth, and wherein said first and second wheels are mounted such that the discontinuity in the periphery of each are adjacent.

5. A torque measuring system in accordance with claim 2 wherein said wheels are mounted on the shaft in a predetermined offset relative position such that, with the shaft in a no-load condition, the tooth spacing interstices are nonuniform with each tooth spacing interstice in a circumferential direction in the direction of shaft torque deflection from a tooth of one of said first and second wheels defined as a reference wheel to an adjacent tooth of the other wheel defined as a torque wheel being smaller than the tooth spacing interstice from a tooth of the torque wheel to the adjacent tooth of the reference wheel in order to accommodate a large range of tooth deflection due to torque for measurement of an extended range of shaft torque deflection.

6. A torque measuring system in accordance with claim 5 wherein said predetermined relative mounting position of said first and second wheels is such that, upon torque deflection of the shaft in a range of measurement interest, the tooth spacing interstices are approximately uniform.

7. A torque measuring system in accordance with claim 5 wherein said detector means includes means for determining the ratio of the sum of the circumferential tooth spacing interstices of the teeth of the reference wheel to adjacent respective teeth of the torque wheel in the direction of shaft torque deflection, to the total circumference of said wheels, as a measure of shaft torque.

8. A torque measurement system in accordance with claim 5 wherein said single detector means comprises a single variable reluctance sensor for providing an AC output signal varying in accordance with said tooth spacing interstices.

9. A torque measurement system in accordance with claim 8 including zero crossing detector means responsive to said AC output signal, and a bistable multivibrator responsive to said zero crossing detector means for generating a pulse train output alternating in phase between successive tooth spacing interstices, the pulse widths of pulses in said pulse train output representative of circumferential widths of said tooth spacing interstices.

10. A torque measurement system in accordance with claim 9 wherein said discontinuity in tooth spacing on said first and second wheels generates a pulse cycle in the pulse train output of said multivibrator which is substantially wider than other pulses in said pulse train output, and including indexing means for sensing said substantially wider pulse cycle to provide system indexing at least once per shaft revolution.

11. A torque measuring system in accordance with claim 10 including signal processing means responsive to said multivibrator pulse train output for averaging the pulse widths of alternate phases as determined by said indexing means of said pulse train output to represent an average on condition corresponding to the average tooth spacing from a tooth of a particular one of said first and second wheels serving as a reference wheel to an adjacent tooth of the other wheel serving as a torque wheel, said signal processing means including means for generating from said average pulse width a DC voltage proportional to torque.

12. A torque measuring system in accordance with claim 11 wherein said signal processing means also averages the pulse widths of opposite alternate phases of said multivibrator pulse train output to generate an average off value corresponding to the average tooth spacing from a tooth on the torque wheel to the adjacent tooth in the reference wheel, said signal processing means including an adder functioning to total the average pulse width corresponding to the on condition and the average pulse width corresponding to the off condition to generate a total, divider means for dividing the average on pulse width by the average total to generate a quotient which is representative of torque, and digital to analog converter means for converting said quotient to a DC voltage proportional to torque.

13. A torque measuring system for measuring torque on a shaft comprising first and second toothed wheels mounted in spaced apart relationship on the shaft, each of said first and second wheels having a plurality of axially extending spaced teeth along its periphery extending into spaces between the teeth of the other wheel and forming therewith an interlaced array of teeth having tooth spacing interstices therebetween, said first and second wheels being mounted so that their teeth are offset with respect to one another in a no load condition so as to permit greater tooth deflection due to torque, at least one of said first and second wheels having at least one sensible index marker on its periphery comprising a discontinuity in said tooth spacing interstices, a single detector means rotatable relative to the shaft and mounted proximate the shaft near said interlaced array of teeth, said single detector means responsive to circumferential widths of said interstices for providing an indication of shaft torque, said single detector means also responsive to said at least one sensible index marker for providing an indication for system indexing at least once per shaft revolution.

14. A torque measuring system in accordance with claim 13 wherein each of said first and second wheels has a circumference C, and each of said first and second wheels is provided with N−1 axially extending teeth, spaced apart by a circumferential distance C/N to thereby define a discontinuity corresponding to a missing tooth.

* * * * *